United States Patent
Takeda

(10) Patent No.: US 12,449,581 B2
(45) Date of Patent: Oct. 21, 2025

(54) POLARIZING PLATE, METHOD OF MANUFACTURING THE SAME AND OPTICAL APPARATUS

(71) Applicant: DEXERIALS CORPORATION, Tochigi (JP)

(72) Inventor: Tomu Takeda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 392 days.

(21) Appl. No.: 17/999,537

(22) PCT Filed: May 21, 2021

(86) PCT No.: PCT/JP2021/019368
§ 371 (c)(1),
(2) Date: Nov. 21, 2022

(87) PCT Pub. No.: WO2021/241439
PCT Pub. Date: Dec. 2, 2021

(65) Prior Publication Data
US 2023/0204840 A1 Jun. 29, 2023

(30) Foreign Application Priority Data
May 25, 2020 (JP) ................................. 2020-090347

(51) Int. Cl.
*G02B 5/30* (2006.01)
*G02B 1/14* (2015.01)
*G02F 1/1335* (2006.01)

(52) U.S. Cl.
CPC ............. *G02B 5/3058* (2013.01); *G02B 1/14* (2015.01); *G02B 5/3066* (2013.01); *G02F 1/133548* (2021.01)

(58) Field of Classification Search
CPC ...... G02B 5/3058; G02B 1/14; G02B 5/3066; G02B 5/30; G02B 5/3025; G02B 27/28; G02B 27/283; G02F 1/133548
(Continued)

(56) References Cited

U.S. PATENT DOCUMENTS

| 2009/0066885 A1 | 3/2009 | Kumai |
| 2013/0286358 A1* | 10/2013 | Takahashi ............. G03B 21/14 353/20 |

(Continued)

FOREIGN PATENT DOCUMENTS

| EP | 2680048 A1 | 1/2014 |
| JP | 2010066571 A | 3/2010 |

(Continued)

OTHER PUBLICATIONS

"International Application Serial No. PCT/JP2021/019368, International Search Report dated Jul. 13, 2021", w/ English Translation, (Jul. 13, 2021).

(Continued)

*Primary Examiner* — Arnel C Lavarias
(74) *Attorney, Agent, or Firm* — Schwegman Lundberg & Woessner, P.A.

(57) ABSTRACT

A polarizing plate has a wire grid structure including a transparent substrate and a plurality of protrusions formed on a first surface of the transparent substrate, extending in a first direction, and periodically arranged apart from each other at a pitch shorter than a wavelength of light in a use band, each of the plurality of protrusions includes a reflective layer, a dielectric layer, and an absorption layer in order from the transparent substrate, and a top surface and a side surface of each of the plurality of protrusions are coated with a protective film made of a dielectric material, the protective film has a cross-sectional area that gradually increases from (Continued)

the top surface side to the transparent substrate side when viewed from a cross section obtained by cutting a protrusion along a plane perpendicular to a surface of the transparent substrate and perpendicular to the first direction.

17 Claims, 6 Drawing Sheets

(58) Field of Classification Search
USPC ............ 359/485.05, 483.01, 485.01, 487.01, 359/487.03, 489.01, 489.06; 362/19; 353/20
See application file for complete search history.

(56) References Cited

U.S. PATENT DOCUMENTS

| | | |
|---|---|---|
| 2018/0081103 A1 | 3/2018 | Takeda |
| 2018/0267221 A1* | 9/2018 | Oowada ................ G03B 21/14 |
| 2019/0094438 A1 | 3/2019 | Takada et al. |
| 2019/0391320 A1 | 12/2019 | Oowada |
| 2020/0081287 A1* | 3/2020 | Sugawara ......... G02F 1/133528 |
| 2023/0168422 A1* | 6/2023 | Takeda .................. G02B 1/116 |
| | | 359/485.05 |

FOREIGN PATENT DOCUMENTS

| | | |
|---|---|---|
| JP | 2016536651 A | 11/2016 |
| JP | 2016212156 A | 12/2016 |
| JP | 2018163253 A | 10/2018 |
| JP | 2019066809 A | 4/2019 |
| JP | 2019536074 A | 12/2019 |
| JP | 2020003556 A | 1/2020 |
| KR | 20070092368 A | 9/2007 |
| KR | 20130000756 A | 1/2013 |
| WO | WO-2010001763 A1 | 1/2010 |
| WO | WO-2012115059 A1 | 8/2012 |
| WO | WO-2013046921 A1 | 4/2013 |
| WO | WO-2015060939 A1 | 4/2015 |
| WO | WO-2016163390 A1 | 10/2016 |
| WO | WO-2017155017 A1 | 9/2017 |
| WO | WO-2018097873 A1 | 5/2018 |

OTHER PUBLICATIONS

"Chinese Application No. 202180037075.5, Office Action dated Sep. 6, 2025", w/ English Translation, (Sep. 6, 2025), 13 pgs.

* cited by examiner

POLARIZING PLATE, METHOD OF MANUFACTURING THE SAME AND OPTICAL APPARATUS

PRIORITY APPLICATIONS

This application is a U.S. National Stage Filing under 35 U.S.C. § 371 from International Application No. PCT/JP2021/019368, filed on May 21, 2021, and published as WO2021/241439 on Dec. 2, 2021, which claims the benefit of priority to Japanese Patent Application No. 2020-090347, filed May 25, 2020; the benefit of priority of each of which is hereby claimed herein, and which applications and publication are hereby incorporated herein by reference in their entireties.

TECHNICAL FIELD

The present invention relates to a polarizing plate, a method of manufacturing a polarizing plate and an optical apparatus.

BACKGROUND ART

A polarizing plate is an optical element that absorbs light polarized in one direction and transmits light polarized in a direction orthogonal to that one direction. In principle, liquid crystal display devices require a polarizing plate. In particular, in liquid crystal display devices that use a light source having a large luminous energy, such as transmissive liquid crystal projectors, the polarizing plate is exposed to powerful radiation. Therefore, the polarizing plate requires excellent heat resistance and light resistance. The polarizing plate must be able to be formed in a size of about several cm, and also requires a high extinction ratio and an ability to control the reflectance characteristics. Wire grid inorganic polarizing plates have been proposed in response to these requirements.

A wire grid polarizing plate has a structure in which a multitude of conductive wires that extend in one direction are arranged on a substrate at a narrower pitch (several tens of nm to several hundred nm) than the wavelength of the light being used. When light is incident upon this polarizing plate, light that is polarized parallel to the direction of extension of the wires (TE waves (S-waves)) cannot pass through the polarizing plate, whereas light that is polarized in a direction perpendicular to the direction of extension of the wires (TM waves (P-waves)) can pass through the polarizing plate.

Wire grid polarizing plates have excellent heat resistance and light resistance, can be made with a comparatively large size, and have a high extinction ratio. Furthermore, by forming the polarizing plate with a multilayer structure, the reflectance characteristics of the wire grid polarizing plate can also be controlled, and because image degradation caused by ghosting and the like, which occurs when return light that is reflected at the surface of the polarizing plate is reflected again inside the liquid crystal projector, can be reduced, such polarizing plates are suited to applications such as liquid crystal projectors.

Due to the above circumstances, various polarizing plates have been proposed as examples of wire grid polarizing plates.

CITATION LIST

Patent Literature

Patent Literature 1: Japanese Translation of PCT Patent Application Publication No. 2016-536651

Patent Literature 2: Japanese Translation of PCT Patent Application Publication No. 2019-536074

SUMMARY OF INVENTION

Problems to be Solved by the Invention

Patent Literature 1 discloses a polarizer in which side bars that can assist each other are formed on sides of a wire grid polarizer (polarizing plate). It describes that the durability of the wire grid polarizer can be improved, and good polarization properties are shown in the visible spectrum. However, in order to improve the durability of a wire grid polarizer with a high aspect ratio using only side bars, the side bar width is naturally thicker, which does not provide good polarization characteristics such as reduced transmittance and increased reflectivity. Similarly, embedding between wire grid polarizers improves the durability of the wire grid polarizer enough to be touched, but does not provide good polarization characteristics such as lower transmittance and higher reflectivity.

Patent Literature 2 discloses a polarizer in which an overcoat layer is formed from the tip to the side wall of a wire grid polarizer (polarizing plate), and a polarizer in which an antireflection layer is formed on the overcoat layer. It describes that wire grid polarizers can be durable and have high performance. However, even if a wire grid polarizer is supported by an overcoat layer to avoid collapse, the inclusion of an air layer does not provide high-performance polarization properties such as reduced transmittance and increased reflectivity. In addition, although the polarization characteristics are expected to be recovered by forming an antireflection layer on top of it, it is certain that the cost will increase due to the increase in the number of processes.

In recent years, lighting and display light sources have evolved from lamps to LEDs and then to lasers, and liquid crystal projectors also use a number of semiconductor lasers (LDs) to achieve high luminous fluxes and high brightness. As a result, polarizing plates are required to have high transmittance characteristics while being able to withstand high luminous, intense light environments. This requires the proposal of a polarizer with an optimized grid structure including a protective film.

The present invention has been made in view of the above circumstances, and aims to provide a polarizing plate, a method of manufacturing the same, and an optical apparatus equipped with the polarizing plate, which improves light transmission characteristics in the transmission axis direction while maintaining durability such as preventing collapse of the grid by optimizing the grid structure including a protective film.

Means for Solving the Problems

In order to solve the above problems, the present invention provides the following means.

(1) A polarizing plate according to one aspect of the present invention is a polarizing plate having a wire grid structure, including a transparent substrate and a plurality of protrusions formed on the first surface of a transparent substrate, extending in a first direction, and periodically arranged apart from each other at a pitch shorter than a wavelength of light in a use band, wherein each of the plurality of protrusions includes a reflective layer, a dielectric layer, and an absorption layer in order from the transparent substrate, and the top surface and the side surface of each of the plurality of protrusions are coated with a protective film made of a dielectric material, and wherein the protective film has a cross-sectional area that gradually increases from the top surface side to the transparent substrate side when viewed from a cross section obtained by cutting the protrusion along a plane perpendicular to the surface of the transparent substrate and perpendicular to the first direction.

(2) In the above aspect, the shape of the protective film may be approximately symmetrical with reference to the center between the adjacent protrusions.

(3) In the above aspect, the bottom surface of the protective film may be on the transparent substrate.

(4) In the above aspect, the transparent substrate may be carved along the surface extending from the outer circumferential surface of the protective film covering the sides of the protrusions.

(5) A method of manufacturing a polarizing plate according to another aspect of the present invention is a method of manufacturing a polarizing plate having a wire grid structure, including a step of laminating a reflection layer, a dielectric layer and an absorption layer on the first surface of a transparent substrate in order to fabricate a laminate consisting of the reflection layer, the dielectric layer and the absorption layer, a step of forming a plurality of protrusions extending in a first direction, and periodically arranged at a pitch shorter than a wavelength of light in a use band by selectively etching the laminate, and a step of forming a protective film made of a dielectric layer covering the surface of each of the plurality of protrusions, wherein the step of forming the protective film includes a step of etching the protective film so that the protective film is formed by a gradual increase in area from the top surface side to the transparent substrate side when viewed from a cross section cut by a plane perpendicular to the surface of the transparent substrate and perpendicular to the first direction.

(6) An optical apparatus according to another aspect of the present invention includes the polarizing plate of the above aspect.

Effects of the Invention

According to the present invention, a polarizing plate with improved light transmission characteristics in the transmission axis direction while maintaining durability can be provided.

EMBODIMENTS FOR CARRYING OUT THE INVENTION

Embodiments of the present invention are described below in further detail with reference to the drawings. The drawings used in the following description may sometimes be drawn with specific portions enlarged to facilitate comprehension of the features of the present invention, and the dimensional ratios and the like between the constituent elements may differ from the actual values. The materials and dimensions and the like presented in the following description are merely examples, which in no way limit the present invention, and may be altered as appropriate within the scope of the present invention.

Polarizing Plate (First Embodiment)

Figure 1:
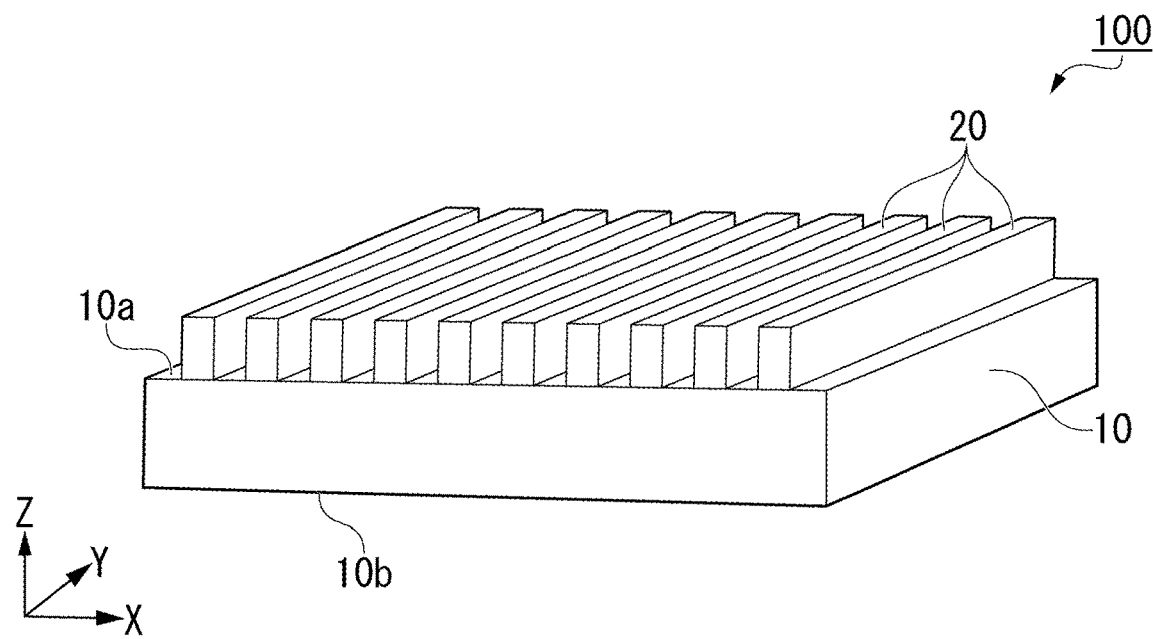
FIG. 1 is a schematic perspective view of a polarizing plate according to one embodiment of the present invention.

FIG. 1 is a perspective view of a polarizing plate according to one embodiment of the present invention.

The polarizing plate 100 shown in FIG. 1 is a polarizing plate having a wire grid structure including a transparent substrate 10 and a plurality of protrusions 20 formed on the first surface 10a of a transparent substrate 10, extending in a first direction (Y direction), and arranged at a pitch shorter than a wavelength of light in a use band. In FIG. 1, the protective film covering the protrusions 20 is not shown.

Here, as shown in FIG. 1, the extending direction (first direction) of the protrusions 20 is referred to as the Y-axis direction. The direction perpendicular to the Y-axis direction and in which the protrusions 20 are arranged along the main surface of the transparent substrate 10 is called the X-axis direction. The direction perpendicular to the Y-axis direction and the X-axis direction and perpendicular to the principal plane of the transparent substrate 10 is called the Z-axis direction. The light entering the polarizing plate 100 may come from either the first surface 10a side or the second surface 10b side of the transparent substrate 10, but preferably, as shown in FIG. 1, it is entered from the Z-axis direction perpendicular to the X-axis direction and the Y-axis direction on the first surface side (grid-forming surface side) where the plurality of protrusions 20 are formed on the transparent substrate 10.

A polarizing plate with a wire-grid structure attenuate polarized waves with electric field components parallel to the Y-axis (TE waves (S waves)) and transmit polarized waves with electric field components parallel to the X-axis (TM waves (P waves)) by utilizing the four effects of transmission, reflection, interference, and selective optical absorption of polarized waves due to optical anisotropy. Therefore, in FIG. 1, the Y-axis direction is the direction of the absorption axis of the polarizing plate 100 and the X-axis direction is the direction of the transmission axis of the polarizing plate 100.

Figure 2:
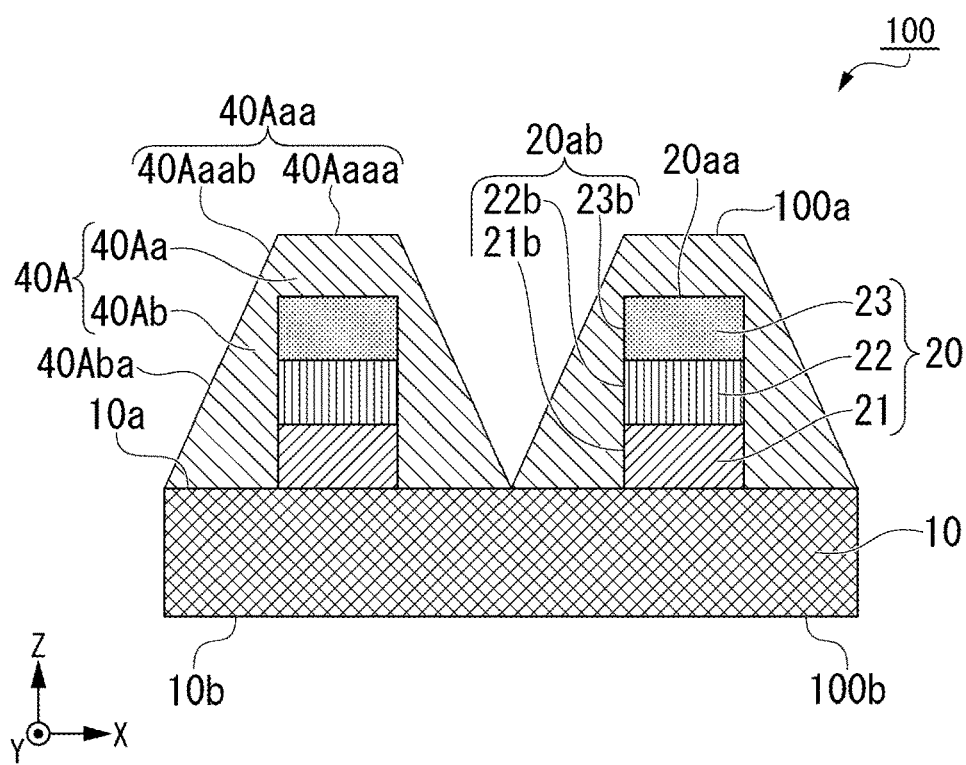
FIG. 2 is a schematic cross-sectional view of the polarizing plate according to one embodiment.

FIG. 2 is a cross-sectional view of the polarizing plate according to one embodiment.

The polarizing plate 100 shown in FIG. 2 includes a transparent substrate 10 and a plurality of protrusions 20 formed on the first surface 10a of a transparent substrate 10, extending in a first direction, and periodically arranged apart from each other at a pitch shorter than a wavelength of light in a use band, wherein each of the plurality of protrusions 20 includes a reflective layer 21, a dielectric layer 22, and an absorption layer 23 in order from the transparent substrate 10, and the top surface 20aa and the side surface 20ab of each of the plurality of protrusions 20 is coated with a protective film 40A made of a dielectric material, and wherein the protective film 40A has a cross-sectional area that gradually increases from the top surface 20aa side to the transparent substrate 10 side when viewed from a cross section obtained by cutting the protrusion 20 along a plane perpendicular to the surface 10a of the transparent substrate 10 and perpendicular to the first direction.

In addition, the polarizing plate 100 of the present embodiment has the transparent substrate 10, the reflective layer 21, the dielectric layer 22, the absorption layer 23, and the protective film 40A, and may have other layers as long as it manifests the effect of the present invention.

Light entering from the side of the polarizing plate 100 shown in FIG. 2 where the plurality of protrusions 20 are formed (the grid-forming surface side) is partially absorbed and attenuated as it passes through the absorption layer 23 and the dielectric layer 22. Of the light transmitted through the absorption layer 23 and the dielectric layer 22, polarized waves (TM waves (P waves)) transmit through the reflection layer 21 with high transmittance. On the other hand, of the light transmitted through the absorption layer 23 and the dielectric layer 22, the polarized wave (TE wave (S wave)) is reflected by the reflection layer 21. The TE wave reflected by the reflecting layer 21 is partly absorbed and partly reflected back to the reflecting layer 21 when it passes through the absorbing layer 23 and the dielectric layer 22. In addition, the TE wave reflected by the reflecting layer 21 interferes and attenuates when passing through the absorbing layer 23 and the dielectric layer 22. By selectively attenuating the TE wave as described above, the polarizing plate 100 can obtain desired polarization characteristics.

Figure 3:
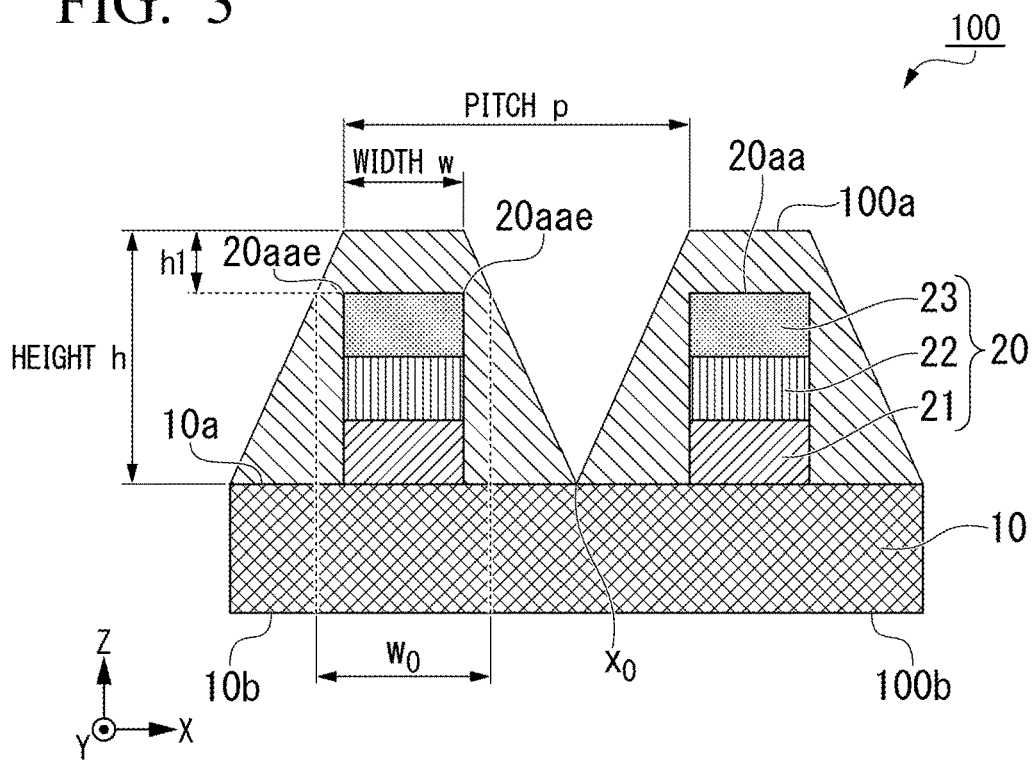
FIG. 3 is a schematic cross-sectional view for explaining dimensions of the polarizing plate shown in FIG. 2.

The dimensions of the polarizing plate 100 in the present specification are described with reference to FIGS. 2 and 3. The height h of the grid, which is the dimension in the Z-axis direction perpendicular to the principal plane of the transparent substrate 10 in FIG. 3, means the combined height of the protrusion 20 and the height of the protective film 40A (the thickness of the upper protective film 40Aa covering the top surface 20 aa of the protrusion 20) h1. The width w means the X-axis dimension of the top surface 40Aaaa of the protective film 40A when viewed from the Y-axis direction along the extending direction of the protrusions 20 provided with the protective film 40A. When the polarizing plate 100 is viewed from the Y-axis direction along the extending direction of the protrusions 20, the repetition interval of the protrusions in the X-axis direction is called pitch p.

In the polarizing plate 100 of the present embodiment, the pitch p of the protrusions 20 is not particularly restricted if it is shorter than the wavelength of the light in the used band. From the viewpoint of ease of fabrication and stability, the pitch p of the plurality of protrusions 20 is preferably 100 nm to 200 nm, for example. The pitch p of the protrusions 20 can be measured by observing them with a scanning electron microscope or a transmission electron microscope. For example, a scanning electron microscope or a transmission electron microscope can be used to measure the pitch p at any 4 positions, and the arithmetic mean value can be taken as the pitch p of the protrusions 20. Hereafter, this measurement method is referred to as electron microscopy method.

The polarizing plate 100 of the present embodiment is characterized by optimizing the shape of the protective film covering from the grid tip to the intergrid. This makes it possible to improve light transmission characteristics along the transmission axis while maintaining durability.

[Transparent Substrate]

As for the transparent substrate 10, there is no particular restriction as long as the substrate shows translucency to the light of the used band, and it can be selected appropriately according to the purpose. "Translucent to the light in the used band" does not mean that the transmittance of the light in the used band is 100%, but only that it shows translucency that can retain its function as a polarizing plate. Visible light with a wavelength of about 380 nm to 810 nm, for example, can be mentioned as the light in the use band. The main surface shape of the transparent substrate 10 is not particularly limited, and the shape (for example, a rectangular shape) is appropriately selected according to the purpose. The average thickness of the transparent substrate 10 is preferably, for example, 0.3 mm to 1 mm.

The constituent material of the transparent substrate 10 is preferably a material having a refractive index of 1.1 to 2.2, and specific examples include glass, rock crystal, quartz and sapphire. From the viewpoints of cost and transmittance, the use of glass, and particularly quartz glass (refractive index: 1.46) and soda lime glass (refractive index: 1.51), is preferred. There are no particular limitations on the composition of the glass material, and inexpensive glass materials such as silicate glass, which is widely used as optical glass, may also be used.

From the standpoint of thermal conductivity, it is preferable to use crystal or sapphire with high thermal conductivity. This provides high light resistance to strong light and is preferably used as a polarizing plate for the optical engine of a projector with high heat generation.

In those cases where a transparent substrate 10 formed from an optically active crystal such as rock crystal or sapphire is used, a plurality of protrusions 20 are preferably arranged along a direction that extends parallel to or perpendicularly to the optical axis of the crystal. This ensures that excellent optical characteristics can be obtained. The optical axis is the axis in a direction for which the difference between the refractive index of an O ray (ordinary ray) of light and the refractive index of an E ray (extraordinary ray) of light travelling along that axial direction is smallest.

[Reflective Layer]

The reflective layer 21 is formed on the transparent substrate 10, and a band-like metal film is arranged in the Y-axis direction, which is the absorption axis.

The reflecting layer 21 functions as a wire-grid-type polarizer, attenuating a polarized wave (TE wave (S wave)) with an electric field component in a direction parallel to the longitudinal direction of the reflecting layer 21, and transmitting a polarized wave (TM wave (P wave)) with an electric field component in a direction perpendicular to the longitudinal direction of the reflecting layer 21. The thickness of the reflective layer 21 is not particularly limited, and for example, 100 nm to 300 nm is preferable. The thickness of the reflective layer 21 can be measured, for example, by the electron microscopy method described above.

The constituent material of the reflective layer 21 is not particularly limited as long as it is a material that is reflective to the light in the use band, and for example, a single element selected from Al, Ag, Cu, Mo, Cr, Ti, Ni, W, Fe, Si, Ge, and Te, or an alloy containing one or more of these elements can be mentioned. Among others, the reflective layer 21 is preferably composed of aluminum or aluminum alloy from the viewpoint of minimizing absorption loss in the wire grid in the visible light region and from the viewpoint of cost. In addition to these metallic materials, it may be composed of non-metallic inorganic films or resin films formed with high surface reflectance due to, for example, coloring.

The reflective layer 21 can be formed as a high-density film by using, for example, a deposition method or a sputtering method. The reflective layer 21 may be composed of two or more layers of different constituent materials.

[Dielectric Layer]

The dielectric layer 22 is formed on the reflecting layer 21, and a dielectric film extending in a band in the Y-axis direction, which is the absorption axis, is arranged. The film thickness of the dielectric layer 22 is formed in such a range that the phase of the polarized light transmitted through the absorption layer 23 and reflected by the reflection layer 21 deviates by half a wavelength with respect to the polarized light reflected by the absorption layer 23. Specifically, the thickness of the dielectric layer 22 is appropriately set in the range of 1 nm to 500 nm, where the phase of polarization can be adjusted to enhance the interference effect. The film thickness of this dielectric layer 22 can be measured, for example, by the electron microscopy method described above. The dielectric layer 22b is also formed as a barrier layer to suppress the interdiffusion of constituent elements between the reflecting layer 21 and the absorbing layer 23 described later.

The materials composing the dielectric layer 22 include common materials such as one selected from Si oxides such as $SiO_2$, metal oxides such as $Al_2O_3$, beryllium oxide and bismuth oxide, $MgF_2$, cryolite, germanium, titanium dioxide, silicon, magnesium fluoride, boron nitride, boron oxide, tantalum oxide, and carbon, or a combination thereof.

Among these, it is preferable that the dielectric layer 22 is composed of one or more oxides selected from the group consisting of Si oxide, Ti oxide, Zr oxide, Al oxide, Nb oxide and Ta oxide in terms of transmittance and the function of the barrier layer.

The refractive index of the dielectric layer 22 is preferably greater than 1.0 and less than 2.5. Since the optical properties of the reflecting layer 21 are also affected by the surrounding refractive index, the optical properties of the polarizing plate 100 can be controlled by selecting the material of the dielectric layer 22. In addition, by properly adjusting the film thickness and refractive index of the dielectric layer 22, a part of the TE wave reflected by the reflecting layer 21 can be reflected back to the reflecting layer 21 when it passes through the absorbing layer 23, and the light passing through the absorbing layer 23 can be attenuated by interference. In this way, by selectively attenuating the TE wave, the desired polarization characteristics can be obtained.

The dielectric layer 22 can be formed as a high-density film by using vapor deposition, sputtering, chemical vapor deposition (CVD) or atomic layer deposition (ALD). The dielectric layer 22 may be composed of two or more layers of different constituent materials.

[Absorption Layer]

The absorption layer 23, which has an absorption effect on the wavelength of light in the used band, is formed on the dielectric layer 22 and is arranged in a band in the direction of the Y-axis, which is the absorption axis. The film thickness of the absorption layer 23 is not particularly limited and is preferably, for example, 5 nm to 50 nm. The thickness of this absorption layer 23 can be measured, for example, by the electron microscopy method described above.

The absorbing layer 23 is preferably composed of one or more materials selected from the group consisting of metals, alloy materials and semiconductor materials.

As the component material of the absorption layer 23, it is appropriately selected according to the wavelength range of the applied light.

Metallic materials include single elements selected from Ta, Al, Ag, Cu, Au, Mo, Cr, Ti, W, Ni, Fe, and Sn, or alloys containing one or more of these elements. The semiconductor materials include one or more selected from Si, Ge, Te, ZnO, and silicide materials ($\beta$-$FeSi_2$, $MgSi_2$, $NiSi_2$, $BaSi_2$, $CrSi_2$, $CoSi_2$, or TaSi, etc.). By using these materials, the polarizing plate 100 has a high extinction ratio relative to the applied visible light range. Among them, the absorption layer 23 is preferably composed of Si as well as Fe or Ta.

When a semiconductor material is used as the absorption layer 23, the bandgap energy of the semiconductor is involved in the absorption action, so it is necessary that the bandgap energy is below the band used.

For example, when used in visible light, it is necessary to use a material with an absorption wavelength of 400 nm or more, i.e., a bandgap of 3.1 eV or less.

The absorption layer 23 can be formed as a high-density film by using, for example, a deposition method or a sputtering method. The absorption layer 23 may be composed of two or more layers of different constituent materials.

<Protective Film>

The top surface 20aa and the side surface 20ab of each of the plurality of protrusions 20 are covered with a protective film 40A made of a material that can constitute the dielectric layer 22 described above. The durability of the polarizing plate 100 can be improved by covering it with the protective film 40A.

The top surface 20aa of the protrusion 20 is also the top surface of the absorption layer 23, the side surface 20ab of the protrusion 20 is composed of the side surface 21b of the reflecting layer 21, the side surface 22b of the dielectric layer 22 and the side surface 23b of the absorption layer 23, and the protective film 40A is composed of an upper protective film 40Aa covering the top surface 20aa of the protrusion 20 and a side protective film 40Ab covering the side surface 20ab of the protrusion 20.

The protective film has a shape in which the cross-sectional area gradually increases from the top surface side to the transparent substrate side (toward the −Z direction) when viewed from a cross section where the protrusion is a plane perpendicular to the surface of the transparent substrate and is cut by a plane perpendicular to the first direction. Here, as for the "shape whose area is gradually increased," the inclined surface of the sectional view may be straight or curved. The shape of a curved inclined surface can be such that the curve follows, for example, a parabolic equation ($Z=aX^2$: a is a coefficient) or a hyperbolic equation ($Z=b/X$: b is a coefficient).

The protective film can have an approximately symmetrical structure as seen from a cross section where the protrusion is cut at a plane perpendicular to the surface of the transparent substrate and at a plane perpendicular to the first direction.

The surface 40Aaa of the upper protective film 40Aa consists of a top surface 40Aaaa and an inclined surface 40Aaab. The inclined surface 40Aaab is a plane in which the protrusion 20 is perpendicular to the surface 10a of the transparent substrate 10 and is a straight inclined surface as seen from a cross section cut by a plane perpendicular to the first direction. The protective film 40A is composed of a roughly tapered portion.

The surface 40Aba of the side protective film 40Ab consists of an inclined surface. The inclined surface 40Aba is also a plane perpendicular to the surface 10a of the transparent substrate 10 with the protrusion 20, and is a straight inclined surface as seen from the cross section cut by the plane perpendicular to the first direction, and is continuous from the inclined surface 40Aaab of the upper protective film 40Aa.

The inclined surface of the protective film 40A consists of an inclined surface 40Aaab and an inclined surface 40Aba, and the protrusion 20 is a surface perpendicular to the surface 10a of the transparent substrate 10, and it is a straight inclined surface as seen from a cross section cut by a surface perpendicular to the first direction.

In the polarizing plate 100 shown in FIG. 2, the inclined plane 40Aaab, which is a straight inclined plane, and the inclined plane 40Aba are inclined at the same angle and connected continuously, but they may be connected discontinuously because their inclination angles are different.

The width $w_0$ of the bottom surface of the upper protective film 40Aa (see FIG. 3) is wider than the width w of the top surface 20aa of the protrusion 20. Therefore, both ends 20aae of the top surface 20aa of the protrusion 20 (see FIG. 3) do not contact the inclined surface of the protective film 40A. In other words, the inclined surface of the protective film 40A is separated from both ends 20aae of the top surface 20aa of the protrusion 20. With this configuration, the protrusion 20 is completely covered by the protective film 40A.

The bottom surfaces of the adjacent protective films 40A (bottom surfaces of the side protective films 40Ab) are in contact with each other (see $x_0$ in FIG. 3), and the first surface 10a of the transparent substrate 10 is not exposed.

In the polarizing plate 100 shown in FIG. 2, the bottom surfaces of the adjacent protective films 40A (the bottom surfaces of the side protective films 40Ab) are in contact with each other, but they can be overlapped and have thickness.

When forming the protective film 40A, it is preferable to use the ALD (Atomic Layer Deposition) method, which is dense, uniform and has excellent film thickness controllability. Also, like the dielectric layer 22 described above, it may be composed of two or more layers with different constituent materials.

In the shape of the protective film 40A, the upper protective film 40Aa does not necessarily need to be flat, and neither does the side protective film 40Ab with respect to the change in the side shape only when there is no inflection point. For example, the cross-sectional shape in which the protrusion 20 is embedded may be such that the surface 40Aaa of the upper protective film 40Aa draws a curved surface and the side 40Aba of the side protective film 40Ab has multiple inflection points, or the protective film 40A may have a height distribution.

When the protective film 40A completely fills the space between the protrusions 20 or partially fills the space between the protrusions 20, the SOG (Spin on Glass) method can be used in addition to the method for forming the dielectric layer 22 described above. According to the SOG method, the flattening is possible without including the air layer.

Known materials for the protective film include metal oxides and metal nitrides, but $Al_2O_3$ is particularly preferable from the standpoint of heat resistance.

(1) Of the protective films 40A, the thickness (height) h1 of the upper protective film 40Aa can be, for example, $0 < h1 < 50$ nm, preferably $0 < h1 < 25$ nm, in consideration of the effect of the characteristics due to the change in the height h of the grid.

(2) It is also necessary that the protective film 40A completely covers the protrusions 20. Therefore, the width $w_0$ of the protective film 40A at the same height position as the height of the protrusion (h-h1) is larger than the width w of the protrusion ($w_0 > w$).

(3) The intersection point between the side inclined surfaces 40Aba of the adjacent protrusions ($X = x_0$ in FIG. 3) is preferably located in the middle (center) between the adjacent protrusions 20 (That is, the shape of the protective film is symmetrical with respect to $X = x_0$) in terms of optical properties, but may be shifted to either protrusion. The features (1) to (3) are also common features in the later embodiment.

[Antireflection Layer]

An antireflection layer may be formed on the second surface 10b of the transparent substrate 10. The antireflection layer can be made of a known antireflection material, for example, a material capable of constituting the dielectric layer 22 can be made of at least two or more multilayer films. The same applies to the polarizing plate 200 and the polarizing plate 300 described later.

As an example of a multilayer film, interface-reflected light can be attenuated by interference by alternately stacking layers of low and high refractive indices with different refractive indices. The thickness of the antireflection layer is not particularly limited and is appropriately set in the range of 1 nm to 500 nm per dielectric layer constituting the dielectric layer 22. The thickness of this antireflection layer can be measured, for example, by the electron microscopy method described above.

The low refractive index layer is composed mainly of $SiO_2$ (oxide of Si), etc. The refractive index of the low index layer is preferably 1.20~1.60 and more preferably 1.30~1.50.

The refractive index of the high refractive index layer is preferably 2.00~2.60 and more preferably 2.10~2.45. Dielectrics with such a high refractive index include niobium pentoxide ($Nb_2O_5$, refractive index 2.33), titanium oxide ($TiO_2$, refractive index 2.33~ 2.55), tungsten oxide (WO3, refractive index 2.2), cerium oxide ($CeO_2$, refractive index 2.2), tantalum pentoxide ($Ta_2O_5$, refractive index 2.16), zinc oxide (ZnO, refractive index 2.1), or indium tin oxide (ITO, Refractive Index 2.06).

The antireflection layer 30 can be formed as a high-density film by utilizing the same film formation method as the dielectric layer 22 described above. It is preferable to use Ion-beam Assisted Deposition (IAD) or Ion Beam Sputtering (IBS), which can form denser films.

Furthermore, considering that a protective film 40A is formed after this, it is desirable that an antireflection layer is designed so that optical properties such as material and film thickness are not degraded.

[Water-Repellent Film]

Furthermore, at least one of the surfaces 100a and 100b of the polarizing plate 100 may be covered with an organic water-repellent film (not shown) in the polarizing plate of the present embodiment. When an antireflection layer is provided on the second surface 10b of the transparent substrate 10, the antireflection layer may be covered with an organic water-repellent film. The same applies to the polarizing plate 200 and the polarizing plate 300 described later, and at least one of the surfaces 200a and 200b of the polarizing plate 200 or at least one of the surfaces 300a and 300b of the polarizing plate 300 may be covered with an organic water-repellent film.

The organic water-repellent film is composed of a fluorinated silane compound such as perfluorodecyltriethoxysilane (FDTS), for example, and can be formed by using the CVD method and the ALD method described above, for example. This improves the reliability of the polarizing plate such as moisture resistance.

Polarizing Plate (Second Embodiment)

Figure 4:
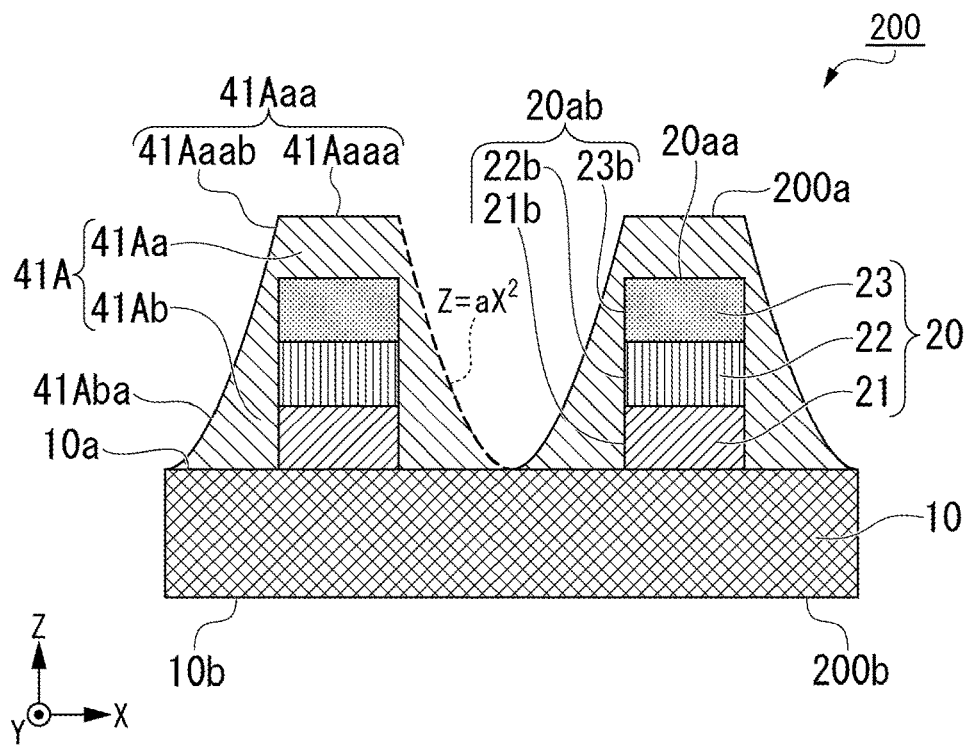
FIG. 4 is a schematic cross-sectional view of a polarizing plate according to another embodiment of the present invention.

FIG. 4 is a cross-sectional view of the polarizing plate according to a second embodiment.

The polarizing plate 200 shown in FIG. 4 includes a transparent substrate 10 and a plurality of protrusions 20 formed on the first surface 10a of a transparent substrate 10, extending in a first direction, and periodically arranged apart from each other at a pitch shorter than a wavelength of light in a use band, wherein each of the plurality of protrusions 20 includes a reflective layer 21, a dielectric layer 22, and an absorption layer 23 in order from the transparent substrate 10, and the top surface 20aa and the side surface 20ab of each of the plurality of protrusions 20 is coated with a protective film 41A made of a dielectric material, and wherein the protective film 41A has an area that gradually increases from the top surface 20aa side to the transparent substrate 10 side when viewed from a cross section obtained by cutting the protrusion 20 along a plane perpendicular to the surface 10a of the transparent substrate 10 and perpendicular to the first direction, in which these constitutions are common to the polarizing plate 100 shown in FIG. 2.

On the contrary, in the polarizing plate 100 shown in FIG. 2, the inclined plane of the protective film 40A is a plane in which the protrusions 20 are perpendicular to the surface 10a of the transparent substrate 10 and is a straight inclined plane as seen from the cross section cut by the plane perpendicular to the first direction, whereas in the polarizing plate 200 shown in FIG. 4, the inclined plane of the protective film 41A is a plane perpendicular to the surface 10a of the transparent substrate 10 with the protrusions 20 and a curved inclined plane as seen from the cross section cut by the plane perpendicular to the first direction. In the polarizing plate 200 shown in FIG. 4, the shape of the curved inclined surface is an example of the equation ($Z=aX^2$) in which the curve is approximately parabolic. The protective film 41A has a nearly parabolic portion.

The protective film 41A consists of an upper protective film 41Aa covering the top surface 20aa of the protrusion 20 and a side protective film 41Ab covering the side surface 20ab of the protrusion 20.

The surface 41Aaa of the upper protective film 41Aa consists of a top surface 41Aaaa and an inclined surface 41Aaab. The inclined surface 41Aaab is a curved inclined surface viewed from a cross section where the protrusion 20 is cut perpendicular to the surface 10a of the transparent substrate 10 and is also cut perpendicular to the first direction.

The surface 41Aba of the side protective film 41Ab consists of an inclined surface. The inclined surface 41Aba is also a curved inclined surface as seen from a cross section where the protrusion 20 is perpendicular to the surface 10a of the transparent substrate 10 and perpendicular to the first direction, and is continuous from the inclined surface 41Aaab of the upper protective film 41Aa.

The inclined surface of the protective film 41A consists of an inclined surface 41Aaab and an inclined surface 41Aba, and the protrusion 20 is a surface perpendicular to the surface 10a of the transparent substrate 10, and it is a curved inclined surface as seen from a cross section cut by a surface perpendicular to the first direction.

In the polarizing plate 200 shown in FIG. 4, the curved inclined surface 41Aaab and the inclined surface 41Aba are connected continuously, but the configuration can be discontinuous.

In the polarizing plate 200 shown in FIG. 4, the inclined surface of the protective film 40A is a curved inclined surface concave to the protrusion 20 side, but on the other hand, the curved inclined surface swollen to the outside may be configured.

Figure 5:
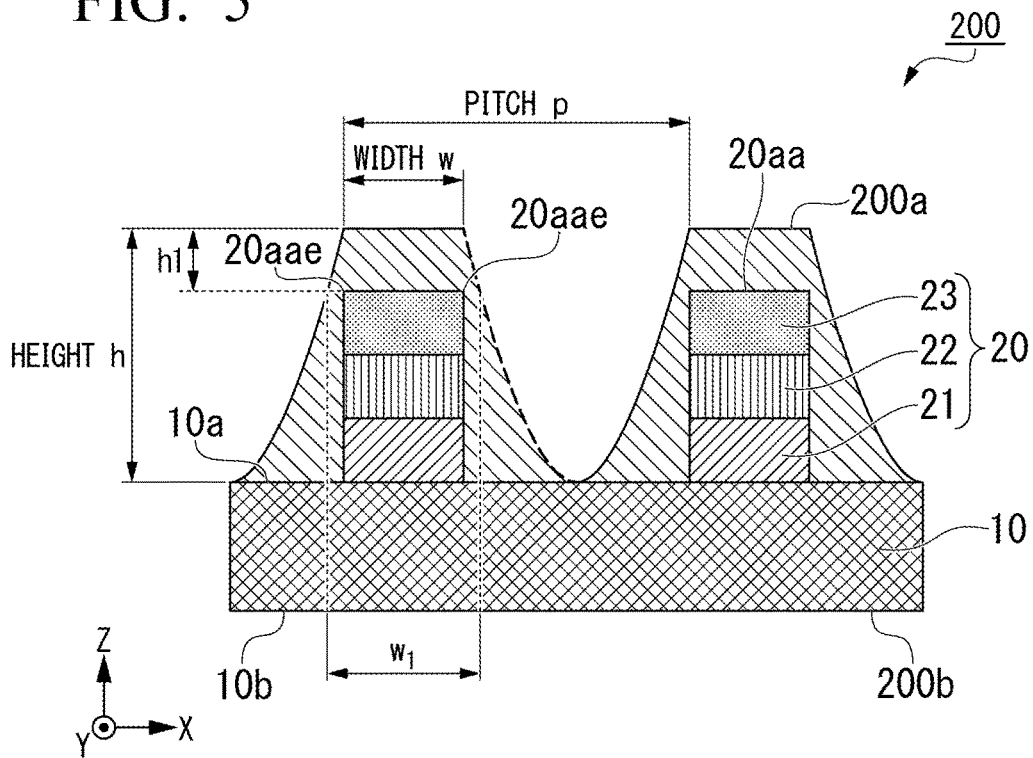
FIG. 5 is a schematic cross-sectional view for explaining dimensions of the polarizing plate shown in FIG. 4.

The width $w_1$ of the bottom surface of the upper protective film 41Aa (see FIG. 5) is wider than the width w of the top surface 20aa of the protrusion 20. Therefore, both ends 20aae of the top surface 20aa of the protrusion 20 (see FIG. 5) do not contact the inclined surface of the protective film 41A. In other words, the inclined surface of the protective film 41A is separated from both ends 20aae of the top surface 20aa of the protrusion 20. With this configuration, the protrusion 20 is completely covered by the protective film 41A.

The bottom surfaces of adjacent protective films 41A (the bottom surfaces of the side protective films 41Ab) are in contact with each other, and the first surface 10a of the transparent substrate 10 is not exposed.

In the polarizing plate 200 shown in FIG. 4, the bottom surfaces of the adjacent protective films 41A (the bottom surfaces of the side protective films 41Ab) are in contact with each other, but they can be overlapped and have thickness.

Polarizing Plate (Third Embodiment)

Figure 6:
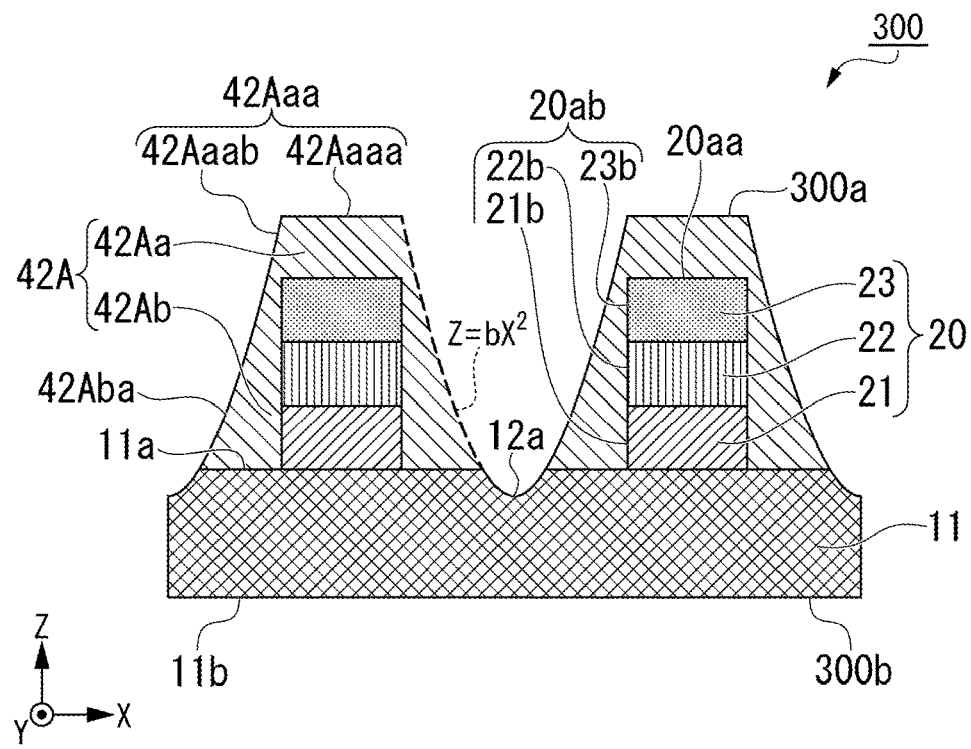
FIG. 6 is a schematic cross-sectional view of a polarizing plate according to another embodiment of the present invention.

FIG. 6 is a schematic cross-sectional view of the polarizing plate according to a second embodiment.

The polarizing plate 300 shown in FIG. 6 includes a transparent substrate 11 and a plurality of protrusions 20 formed on the first surface 11a of a transparent substrate 11, extending in a first direction, and periodically arranged apart from each other at a pitch shorter than a wavelength of light in a use band, wherein each of the plurality of protrusions 20 includes a reflective layer 21, a dielectric layer 22, and an absorption layer 23 in order from the transparent substrate 11, and the top surface 20aa and the side surface 20ab of each of the plurality of protrusions 20 is coated with a protective film 42A made of a dielectric material, and wherein the protective film 42A has an area that gradually increases from the top surface 20aa side to the transparent substrate 11 side when viewed from a cross section obtained by cutting the protrusion 20 along a plane perpendicular to the surface 11a of the transparent substrate 11 and perpendicular to the first direction, in which these constitutions are common to the polarizing plate 100 shown in FIG. 2.

On the contrary, in the polarizing plate 100 shown in FIG. 2, the inclined plane of the protective film 40A is a plane in which the protrusions 20 are perpendicular to the surface 10a of the transparent substrate 10 and is a straight inclined plane as seen from the cross section cut by the plane perpendicular to the first direction, whereas in the polarizing plate 300 shown in FIG. 6, the inclined plane of the protective film 42A is a plane perpendicular to the surface 11a of the transparent substrate 11 with the protrusions 20 and a curved inclined plane as seen from the cross section cut by the plane perpendicular to the first direction. In the polarizing plate 300 shown in FIG. 6, the shape of the curved inclined surface is an example of the equation ($Z=bX^2$) in which the curve is parabolic. The protective film 42A has a parabolic portion.

In addition, the polarizing plate 300 shown in FIG. 6 is in common with the polarizing plate 200 shown in FIG. 4 in that the protrusion 20 is a plane perpendicular to the surface of the transparent substrate and a curved inclined plane when viewed from a cross section cut by a plane perpendicular to the first direction. On the other hand, in the polarizing plate 300 shown in FIG. 6, the transparent substrate is carved, which is different from the polarizing plate 200 shown in FIG. 4, in which the transparent substrate is not carved. Based on this difference in configuration, the polarizing plate 300 shown in FIG. 6 can be said to be a variation of the polarizing plate 200 shown in FIG. 4.

The protective film 42A consists of an upper protective film 42Aa covering the top surface 20aa of the protrusion 20 and a side protective film 42Ab covering the side surface 20ab of the protrusion 20.

The surface 42Aaa of the upper protective film 42Aa consists of a top surface 42Aaaa and an inclined surface 42Aaab. The inclined surface 42Aaab is a curved inclined surface viewed from a cross section where the protrusion 20 is cut perpendicular to the surface 11a of the transparent substrate 11 and is also cut perpendicular to the first direction.

The surface 42Aba of the side protective film 42Ab consists of an inclined surface. The inclined surface 42Aba is also a curved inclined surface as seen from a cross section where the protrusions 20 are perpendicular to the surface 11a of the transparent substrate 11 and perpendicular to the first direction, and is continuous from the inclined surface 42Aaab of the upper protective film 42Aa.

The inclined surface of the protective film 42A consists of an inclined surface 42Aaab and an inclined surface 42Aba, and the protrusions 20 are a surface perpendicular to the surface 11a of the transparent substrate 11, and it is a curved inclined surface as seen from a cross section cut by a surface perpendicular to the first direction.

Figure 7:
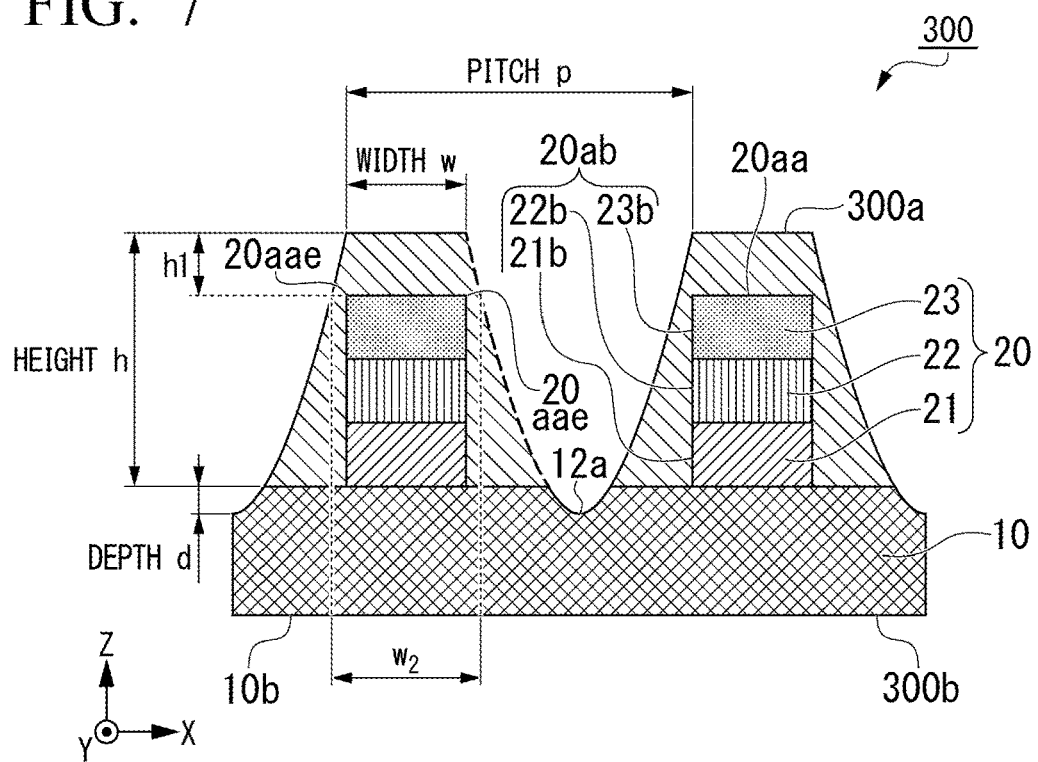
FIG. 7 is a schematic cross-sectional view for explaining dimensions of the polarizing plate shown in FIG. 6.

The transparent substrate 11 has a carved portion 12a carved from the first surface 11a of the transparent substrate 11 to connect continuously to the inclined surface 42Aba of the side protective film 42Abb. The carved portion 12a is formed at a depth d (see FIG. 7) to connect continuously to each inclined surface 42 Aba of the adjacent side protective film 42Abs.

The carved portion 12a is composed of a surface extending along the inclined surface 42 Aba of the side protective film 42Abb.

In the polarizing plate 300 shown in FIG. 6, the carved portion 12a is formed to connect continuously to each inclined surface 42Aba of the adjacent side protective film 42Ab, but the carved portion 12a can be formed to connect discontinuously to each inclined surface 42Aba of the adjacent side protective film 42Abs.

In the polarizing plate 200 shown in FIG. 4, the inclined surface of the protective film 40A is a curved inclined surface concave to the protrusion 20 side, but on the other hand, a curved inclined surface swollen to the outside may be configured.

The width $w_1$ of the bottom surface of the upper protective film 42Aa (see FIG. 7) is wider than the width w of the top surface 20aa of the protrusion 20. Therefore, both ends 20aae of the top surface 20aa of the protrusion 20 (see FIG. 5) do not contact the inclined surface of the protective film 42A. In other words, the inclined surface of the protective film 42A is separated from both ends 20aae of the top surface 20aa of the protrusion 20. With this configuration, the protrusion 20 is completely covered by the protective film 42A.

In the polarizing plate 300 shown in FIG. 6, unlike the polarizing plate 100 shown in FIG. 2 and the polarizing plate 200 shown in FIG. 4, the bottom surfaces of the adjacent protective films 42A (the bottom surfaces of the side protective films 42Ab) are not in contact with each other.

[Method of Manufacturing Polarizing Plate]

The manufacturing method of the polarizing plate of the present embodiment is a method of manufacturing a polarizing plate having a wire grid structure including a step of laminating a reflection layer, a dielectric layer and an absorption layer on the first surface of a transparent substrate in order to fabricate a laminate consisting of the reflection layer, the dielectric layer and the absorption layer, a step of forming a plurality of protrusions extending in a first direction, and periodically arranged at a pitch shorter than a wavelength of light in a use band by selectively etching the laminate, and a step of forming a protective film made of a dielectric layer covering the surface of each of the plurality of protrusions, wherein the step of forming the protective film includes a step of etching the protective film so that the protective film is formed by a gradual increase in area from the top surface side to the transparent substrate side when viewed from a cross section cut by a plane perpendicular to the surface of the transparent substrate and perpendicular to the first direction.

For the formation of the plurality of protrusions, a one-dimensional lattice-like mask pattern is formed with a resist by, for example, photolithography, nanoimprint, etc., on a laminated film formed on one side of a transparent substrate. The portions where the mask pattern is not formed are selectively etched to form a plurality of protrusions arranged on the transparent substrate at a pitch shorter than the wavelength of light in the used band. As an etching method, for example, a dry etching method using an etching gas corresponding to the object to be etched can be mentioned.

For the formation of the protective film, the area between the grids is completely embedded and flattened by the SOG method using, for example, methylsilicate or methylsiloxane as a raw material so as to cover the surface of the protrusions. Then, a one-dimensional lattice-like mask pattern is formed on the resist formed on the protective film by photolithography, nanoimprint, etc., at the position where it overlaps the above protrusions. The shape of the protective film can then be machined by selectively etching the protective film. For example, it can be machined to draw an approximate taper or parabola.

The CVD (Chemical Vapor Deposition) and ALD (Atomic Layer Deposition) methods are undesirable because, during the embedding process between the protrusions, molecules accumulate on the protrusions to fill in between the protrusions, resulting in the formation of an air layer and causing unnecessary reflection due to the formation of an interface with the protective film.

As a result, the polarizing plates shown in FIGS. 1 to 7 are manufactured. The manufacturing method of the polarizing plate of the present embodiment may include a process of forming an antireflection film and a process of coating the surface of the polarizing plate with an organic water-repellent film.

[Optical Apparatus]

The optical apparatus of the present embodiment is equipped with the polarizing plates 100,200 and 300 according to the present embodiment described above. The polarizing plates 100,200 and 300 according to the present embodiment can be used for various applications. The applicable optical apparatus include, for example, liquid crystal displays and liquid crystal projectors, head-up displays and car headlights. In particular, since the polarizing plates 100, 200 and 300 according to the present embodiment are highly transmissive, high brightness can be achieved with high transmittance while having excellent heat resistance even in an environment of high intensity and strong light using several semiconductor lasers (LDs), for example. This makes it suitable for applications such as liquid crystal projectors.

When the optical apparatus according to the present embodiment is equipped with a plurality of polarizing plates, at least one of the multiple polarizers needs to be the polarizers 100, 200 and 300 according to the present embodiment. For example, when the optical apparatus according to the present embodiment is a liquid crystal projector, at least one of the polarizers arranged on the incidence side and the emission side of the liquid crystal panel needs to be the polarizers 100, 200 and 300 according to the present embodiment.

EXAMPLES

Examples of the present invention will be described below, but the present invention is not limited to these examples, and modifications and improvements to the extent that the effect of the present invention is achieved are included in the present invention.
[Simulation]

As the polarizing plate according to the present invention, simulations were performed using the polarizing plate shown in FIG. 2, the polarizing plate shown in FIG. 4, and the polarizing plate shown in FIG. 6 as models. The optical characteristics of these polarizing plates were investigated by electromagnetic field simulation conducted using RCWA (Rigorous Coupled Wave Analysis). A grating simulator GSolver, manufactured by Grating Solver Development Co., was used for the simulations.

Figure 8:
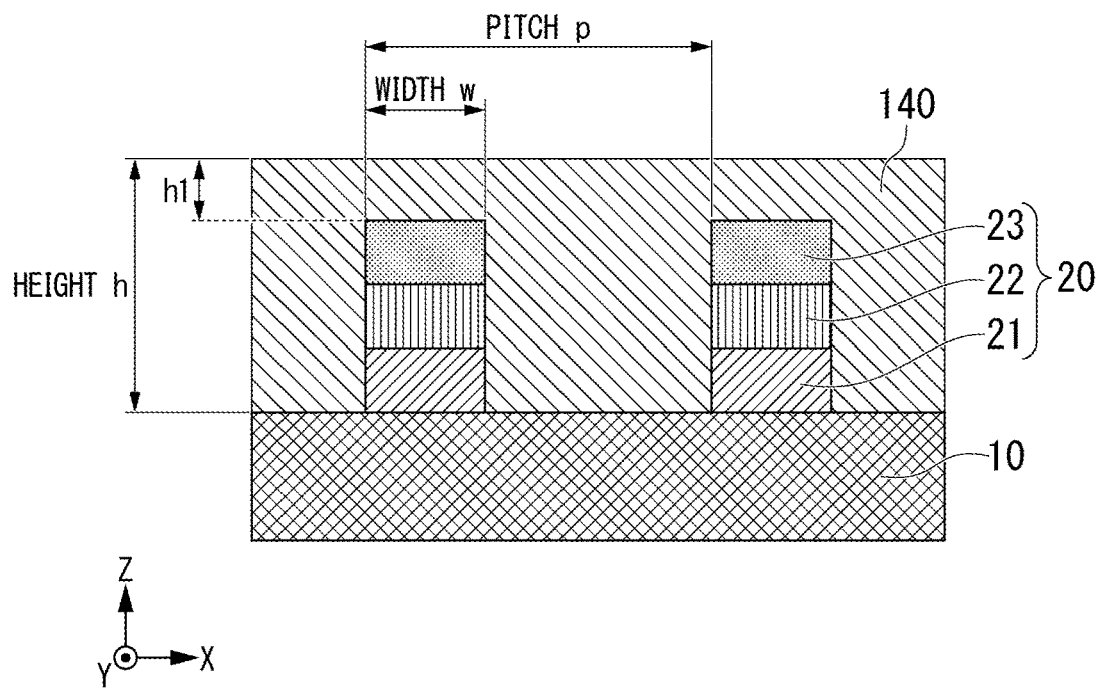
FIG. 8 is a schematic cross-sectional view of a model in the state before the protective film shape processing.
Figure 9:
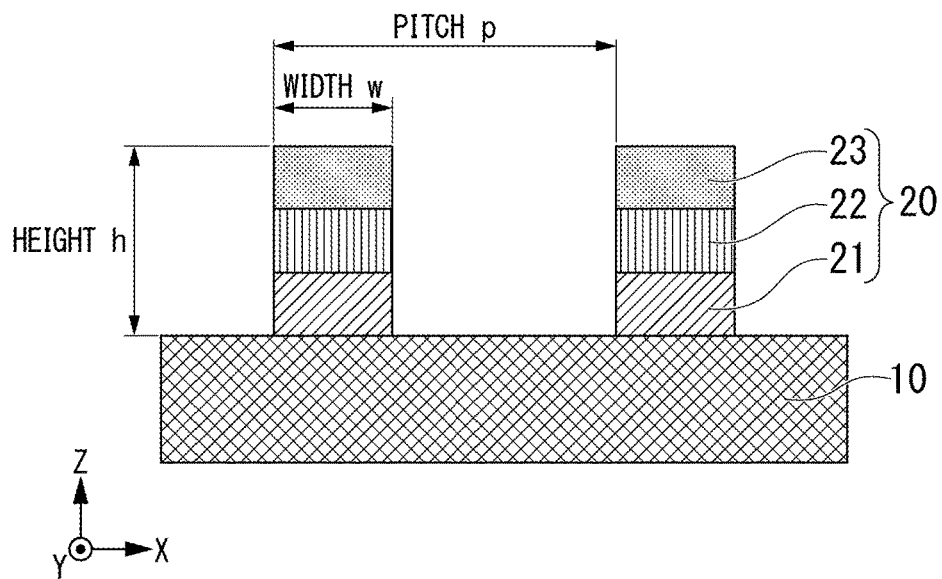
FIG. 9 is a schematic cross-sectional view of a conventional model without a protective film.

For comparison, the model shown in FIG. 8, in which the protrusions are embedded in the protective film as uniform thickness film, and the model shown in FIG. 9, before the protective film is formed (without the protective film), were also simulated. In FIGS. 8 and 9, the members indicated by the same symbols as those in FIGS. 2, 4 and 6 are the same in material and parameters.

In FIG. 8, reference numeral 140 denotes a layer made of the same material as the protective films 40A, 41A and 42A and showing the state before processing into the protective films 40A, 41A and 42A, and its thickness (height) h1 is the same as the models shown in FIGS. 2, 4 and 6.

In the models of the polarizing plate (protective film with tapered part) shown in FIG. 2, the polarizing plate (parabolic part) shown in FIG. 4, and the polarizing plate (parabolic part+carved part) shown in FIG. 6, the common parameters and materials are as follows.

Transparent substrate: material (alkali-free glass), thickness (0.7 mm),
Reflecting layer: material (Al), thickness (250 nm), width w (35 nm),
Dielectric layer: material ($SiO_2$), thickness (5 nm), width w (35 nm),
Absorption layer: material (FeSi), thickness (25 nm), width w (35 nm),
Protective film: material ($SiO_2$), height h1 (15 nm)
Grid: height (sum of protrusion and protective film) h (295 nm), pitch p (141 nm).

In each of the examples of the polarizing plate shown in FIG. 2, the polarizing plate shown in FIG. 4 and the polarizing plate shown in FIG. 6, the shape of the protective film is symmetrical with respect to the center (For example, $X=x_0$ in FIG. 3) between the adjacent protrusions.

In the model of the polarizing plate shown in FIG. 2, the width of the top surface 40Aaaa was made the same as the width W of the protrusion, and the width $w_0$ (see FIG. 3) of the protective film 40A at the same height position as the height of the protrusion (h-h1) was made 40.39 nm.

In the polarizing plate model shown in FIG. 4, the shape of the curved inclined plane can be expressed by the parabolic equation ($Z=aX^2$) when viewed from the cross section cut by the plane perpendicular to the surface of the transparent substrate and the plane perpendicular to the first direction. The width of the top surface 41Aaaa was set to be the same as the width W of the protrusion, and the width $w_1$ (see FIG. 5) of the protective film 41A at the same height position as the height of the protrusion (h-h1) was set to 37.73 nm.

In the polarizing plate model shown in FIG. 6, the shape of the curved inclined surface can be expressed by the parabolic equation ($Z=bX^2$) when viewed from the cross section cut by the plane perpendicular to the surface of the transparent substrate and the plane perpendicular to the first direction. The width of the top surface 42Aaaa was made the same as the width W of the protrusion, and the width $w_2$ (see FIG. 7) of the protective film 42A at the same height position as the height of the protrusion (h-h1) was made 37.55 nm.

In the polarizing plate model shown in FIG. 6, the depth d of the carved portion (see FIG. 7) was set to 20 nm.

Figure 10:
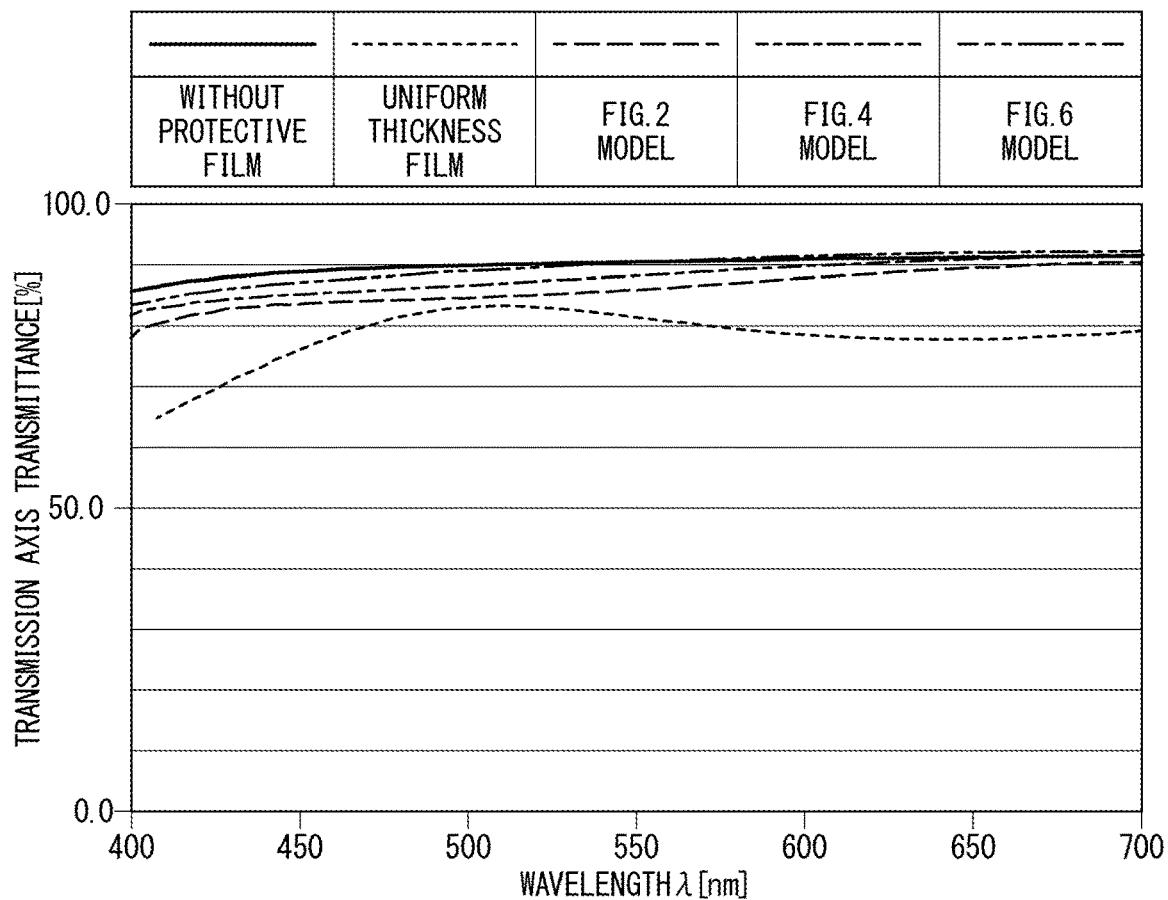
FIG. 10 is a graph showing the transmission axis transmittance in optical properties calculated by simulation is shown in a polarizing plate according to one embodiment of the present invention.

FIG. 10 is a graph showing the spectroscopic waveforms of the transmission axis transmittance in the visible light region (red band: wavelength λ=600~ 680 nm, green band: wavelength λ=520 nm to 590 nm, blue band: λ=430 nm to 510 nm) obtained by the simulation. The horizontal axis shows the wavelength λ (nm) and the vertical axis shows the transmission axis transmittance (%). Here, transmission axis transmittance means the transmittance of polarized light (TM wave) in the transmission axis direction (X-axis direction) entering the polarizing plate.

All of the polarizers shown in FIGS. 2, 4, and 6 have improved transmission axis transmittance over the entire wavelength range (400 nm to 700 nm) compared to the configuration (FIG. 8) in which the protrusion is embedded in the protective film as uniform thickness film.

Comparing the three configurations, the transmission axis transmittance is improved in the order of the polarizing plate (tapered part+carved part) shown in FIG. 6, the polarizing plate shown in FIG. 4, and the polarizing plate shown in FIG. 2.

In the polarizing plate shown in FIG. 6, the transmission axis transmittance is improved to the same level as in the configuration (FIG. 9) before the formation of the protective film (without the protective film) by only slightly carving the transparent substrate with respect to the polarizing plate shown in FIG. 4.

This is thought to be due to the fact that the shape of the protective film extends in the direction of the substrate (−Z direction) in the region below visible light, so that the refractive index difference between the protective film, the protective film and the adjacent air layer gradually decreases, resulting in a higher reflection suppression effect.

Figure 11:
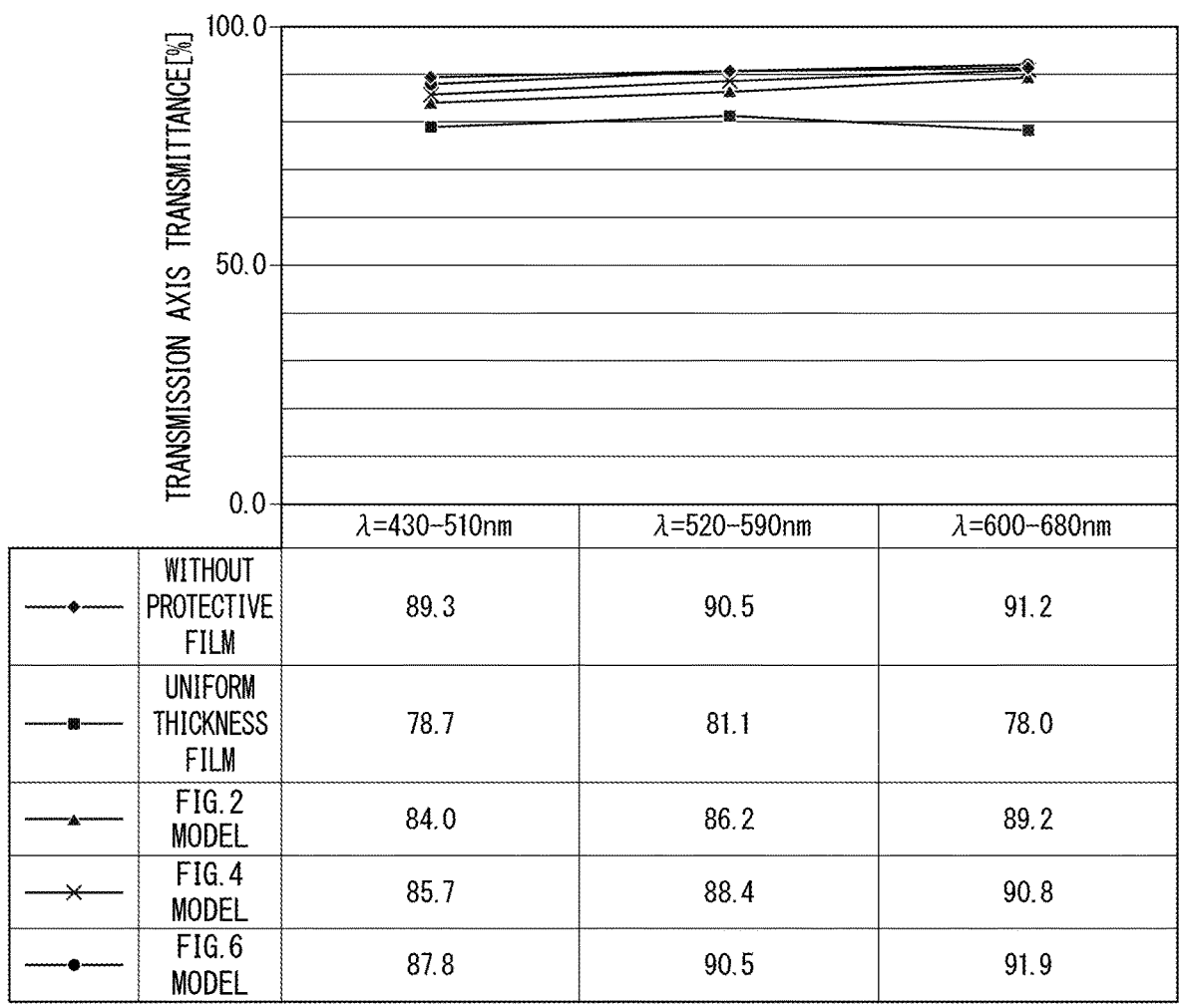
FIG. 11 is a graph showing the average transmission axis transmittance for each wavelength band of the transmission axis transmittance calculated by simulation in a polarizing plate according to one embodiment of the present invention.

FIG. 11 is a graph showing the average value of transmission-axis transmittance for each wavelength band obtained through simulation.

All of the polarizers shown in FIG. 2, FIG. 4, and FIG. 6 have improved average values of transmission axis transmittance over the entire wavelength band compared to the conventional configuration without a protective film.

In addition, when comparing the three configurations, the average value of transmission axis transmittance is improved in the order of the polarizing plate shown in FIG. 6, the polarizing plate shown in FIG. 4, and the polarizing plate shown in FIG. 2 in the entire wavelength band.

In the polarizing plate shown in FIG. 6, the average value of transmission axis transmittance is improved to the same level as that in the configuration (FIG. 9) before the formation of the protective film (without the protective film) by only slightly carving the transparent substrate with respect to the polarizing plate shown in FIG. 4.

DESCRIPTION OF THE REFERENCE SIGNS 10, 11 transparent substrate
10a, 11a first surface
10b, 11b second surface
20 protrusion
21 reflective layer
22 dielectric layer
23 absorption layer
40A, 41A, 42A protective film
100, 200, 300 polarizing plate
100a, 200a, 300a surface of polarizing plate

The invention claimed is:

1. A polarizing plate having a wire grid structure, comprising:
    a transparent substrate; and
    a plurality of protrusions formed on a first surface of the transparent substrate, extending in a first direction, and periodically arranged apart from each other at a pitch shorter than a wavelength of light in a use band, wherein each of the plurality of protrusions includes a reflective layer, a dielectric layer, and an absorption layer in order from the transparent substrate, wherein a top surface and a side surface of each of the plurality of protrusions are coated with a protective film made of a dielectric material, and wherein the protective film has a cross-sectional area that gradually increases from a top surface side to a transparent substrate side when viewed from a cross section obtained by cutting the protrusion along a plane perpendicular to a surface of the transparent substrate and perpendicular to the first direction.

2. The polarizing plate according to claim 1, wherein a shape of the protective film is approximately symmetrical with reference to a center between a adjacent protrusions.

3. The polarizing plate according to claim 1, wherein a bottom surface of the protective film is on the transparent substrate.

4. The polarizing plate according to claim 1, wherein the transparent substrate is carved along a surface extending from a outer circumferential surface of the protective film covering the sides of the protrusions.

5. A method of manufacturing a polarizing plate having a wire grid structure comprising:
    a step of laminating a reflection layer, a dielectric layer and an absorption layer on a first surface of a transparent substrate in order to fabricate a laminate consisting of the reflection layer, the dielectric layer and the absorption layer,
    a step of forming a plurality of protrusions extending in a first direction, and periodically arranged at a pitch shorter than a wavelength of light in a use band by selectively etching the laminate; and
    a step of forming a protective film made of a dielectric layer covering a surface of each of the plurality of protrusions,
    wherein the step of forming the protective film includes a step of etching the protective film so that the protective film is formed by a gradual increase in area from a top surface side to a transparent substrate side when viewed from a cross section cut by a plane perpendicular to a surface of the transparent substrate and perpendicular to the first direction.

6. An optical apparatus comprising the polarizing plate according to claim 1.

7. The polarizing plate according to claim 2, wherein a bottom surface of the protective film is on the transparent substrate.

8. The polarizing plate according to claim 2, wherein the transparent substrate is carved along a surface extending from a outer circumferential surface of the protective film covering the sides of the protrusions.

9. The polarizing plate according to claim 3, wherein the transparent substrate is carved along a surface extending from an outer circumferential surface of the protective film covering the sides of the protrusions.

10. The polarizing plate according to claim 7, wherein the transparent substrate is carved along a surface extending from an outer circumferential surface of the protective film covering the sides of the protrusions.

11. An optical apparatus comprising the polarizing plate according to claim 2.

12. An optical apparatus comprising the polarizing plate according to claim 3.

13. An optical apparatus comprising the polarizing plate according to claim 4.

14. An optical apparatus comprising the polarizing plate according to claim 7.

15. An optical apparatus comprising the polarizing plate according to claim 8.

16. An optical apparatus comprising the polarizing plate according to claim 9.

17. An optical apparatus comprising the polarizing plate according to claim 10.

* * * * *